Patented Nov. 7, 1939

2,178,959

UNITED STATES PATENT OFFICE 2,178,959

LEAVENED BAKED PRODUCT

Jacob Freilich, New York, and Charles N. Frey, Scarsdale, N. Y., assignors to Standard Brands Incorporated, New York, N. Y., a corporation of Delaware No Drawing. Application January 21, 1936, Serial No. 60,070

10 Claims. (Cl. 99—90)

The invention relates to the manufacture of raised or leavened baked products, such as bread, biscuits, rolls, cake and the like. More particularly, it relates to the production of leavened baked products through the utilization of hydrogen peroxide, an alkaline reacting material and yeast, and includes correlated improvements and discoveries whereby the desirable qualities of baked products are enhanced.

Utilization of hydrogen peroxide has been variously made heretofore in the manufacture of baked products, for instance in the production of a diabetic bread from gluten flour. In this procedure hydrogen peroxide is added to a dough prepared from gluten flour, and the dough batch formed into loaves and baked, the leavening being due entirely to the hydrogen peroxide (U. S. Patent 989,189).

A process using a concentrated hydrogen peroxide solution as a leavening agent in the production of bread, cake, biscuits, etc., is described in Patent 1,953,567. In this process hydrogen peroxide or an equivalent amount of an oxygen evolving decomposable compound is added to a dough batch is added to the batch in an amount varying from 0.5% to 2% hydrogen peroxide content based on the flour used, and the dough so produced is molded, allowed to stand until most of the hydrogen peroxide has decomposed, and then baked. The hydrogen peroxide utilized is a stabilized peroxide containing about 27.6% $H_2O_2$.

These procedures, while leading to the production of baked products, are characterized by the non-use therein of yeast or leavening agent other than the hydrogen peroxide. Consequently, the baked products are devoid of certan characteristics which are present in products produced with yeast as the leavening agent. The present invention differs from the prior procedures in that baked products having markedly improved qualities as to volume, texture, taste, flavor and grain are produced through the conjoint use of hydrogen peroxide with yeast, an alkaline reacting material, or a combination thereof. Also a decided reduction in the time required for decomposition of the hydrogen peroxide is effected.

It accordingly is an object of the invention to provide a process for the manufacture of baked goods in which leavening is effected by hydrogen peroxide with yeast or an alkaline reacting material, or a combination thereof.

A further object of the invention is the provision of a process for the production of breads, cakes and the like having improved qualities, readily, economically and effectively under the usual bakery conditions in both small and large bakeries.

An additional object of the invention is to provide a procedure whereby leavened baked goods having improved volume, crust character, color, texture or grain, odor and taste may be produced.

A more particular object of the invention is to provide a process for the manufacture of baked goods in which the leavening is brought about by utilization of a stabilized hydrogen peroxide augmented by yeast or an alkaline reacting material, or a combination thereof.

A still further object of the invention is the provision for the production of a dough containing the usual ingredients entering into the manufacture of breads, cakes and the like, which contains as a leavening agent stabilized hydrogen peroxide, yeast, and/or an alkaline reacting material.

A specific object of the invention is to provide baked products, especially cakes, which have been produced from a dough leavened with hydrogen peroxide and conjointly with yeast or an alkaline reacting material, or a combination thereof.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

In the practice of the invention the manufacture of leavened baked products may be carried out by effecting the leavening thereof through the use of hydrogen peroxide and an augmentor, e. g., along with yeast, or with yeast together with the alkaline reacting material. The leavening of the dough is occasioned by the release of oxygen from the hydrogen peroxide, which is facilitated by the yeast, and also by the carbon dioxide arising from the fermentative activity of the yeast cells. The release of gas or effectuation of a leavening is improved by the incorporation of an alkaline reacting material, thus giving products having improved qualities as to volume, crust, grain, taste, etc.

The hydrogen peroxide by which the leavening is brought about is a solution containing a relatively high percentage of releasable oxygen, i. e., an amount of hydrogen peroxide considerably greater than that contained in the usual solutions of commerce, which are in the neighborhood of 3%. Rather, and preferably, it is desired to utilize a concentrated, highly pure, hydrogen peroxide solution containing in the neighborhood of 30% $H_2O_2$. Such solutions, for handling and ease of manipulation, are desirably stabilized, which stabilization may be effected in various manners, such as, for example, through the use of a dissolved tin compound, as described in Patent 1,958,204, or by means of a salt of pyrophosphoric acid in conjunction with a substituted amine of the aromatic series, as set forth in Patent 2,012,462. The yeast and/or the alkaline reacting material, may be admixed with the dough ingredients prior to or during the formation of a batter or dough, and the hydrogen peroxide near or at the end of the mixing period. Preferably, the incorporation is by mixing the peroxide with a portion of the liquid as the milk, and adding this to the batter at the end of the mixing procedure.

The alkaline reacting material may be one or a combination of several such substances whereby a dough or batter medium having a pH value of from about 5.9 to 8.5 is obtained. More particularly, and preferably the pH value should be for cakes about 6.5–7.5 and for biscuits about 5.9–7.3. Alkaline reacting materials which may be employed are, for example, the following: sodium carbonate, sodium bicarbonate, di- and tri-sodium phosphate, sodium hydroxide, corresponding magnesium salts, and corresponding potassium and ammonium compounds, and the amounts thereof will be such as to give a medium having the above designated pH values. Further, expressed as a percentage of the dough or batter, the alkaline material may be in the amount of 0.035% to 0.28%.

The hydrogen peroxide incorporated with the batter or dough will be governed or determined by the character of the product being manufactured. In other words, the quantity will depend upon the extent to which it is desired to leaven the batch. Consequently the hydrogen peroxide amount can be varied over considerable limits so as to produce a product which is only slightly leavened or raised, or on the other hand a product having such an increase in volume that further additions of the peroxide do not effect further volume increases. It will be realized that the upper limit of hydrogen peroxide addition is dependent in a practicable manner upon the extent to which the mass of dough may be raised. This upper limit represents that amount of hydrogen peroxide which, upon release of its oxygen content, yields an amount of gas which can be just held by the dough or batter. Further increase in the amount of peroxide would result in a rupture of the cellular structure or texture of the product.

It has been found that satisfactory results may be attained through the utilization of from 0.3% to 4.0% hydrogen peroxide based on the total weight of batter or dough. It is desirable in all cases that the hydrogen peroxide be substantially all decomposed prior to the baking operation, since otherwise products having undesirable qualities are obtained. It follows therefrom that the use of larger quantities of hydrogen peroxide will be attended by longer decomposition or proving times, in order to insure thorough decomposition of the peroxide. More particularly, the quantity of peroxide may vary from 0.4% to 0.8%, and especially from 0.47 to 0.7% based upon the weight of the dough. Larger quantities of peroxide may be used but would be attended by lack of economy since the amount greater than that necessary to effect full leavening will be wasted. However, in such case if care is taken to insure complete decomposition of the peroxide no deleterious results will accrue in the baked product.

The yeast incorporated in the dough batch along with the peroxide may be of the usual baking yeast strains, and the amount employed may be from about 0.25% to 1% based upon the total weight of the batter, more especially 0.5.% In the manufacture of cakes, a batter may be produced containing the usual ingredients entering into such batter, as flour, sugar, eggs, shortening, liquid as milk, salt, flavoring, and into such batter there is incorporated a small amount of stabilized hydrogen peroxide containing about 30% $H_2O_2$, and also a small amount of yeast and an alkaline reacting material. The amount of hydrogen peroxide entering into the batch may be about 0.47%, the yeast about 0.5%, and alkaline reacting material, for example, sodium bicarbonate, about 0.07%. When such a dough has been formed, it is permitted to stand at a suitable temperature for proofing, and hydrogen peroxide decomposition, until by a suitable test, as with a 1% solution of potassium iodide, it is shown that the hydrogen peroxide has all been decomposed. Thereafter the batter is shaped into desired form, as loaves or layers, and baked.

The test for decomposition of hydrogen peroxide above referred to is carried out in the following manner. A 1% solution of potassium iodide is prepared and admixed with or applied to a portion of the batter or dough. When the mixture of batter and potassium iodide solution no longer produces a blue color, the complete decomposition of the hydrogen peroxide is indicated.

As an illustrative embodiment of a manner in which the invention may be practised, the following examples are given:

*Example I*

A dough or batter may be prepared by the admixing of the following ingredients:

| | Grams |
|---|---|
| Flour | 375 |
| Sugar | 300 |
| Eggs | 225 |
| Shortening | 150 |
| Liquid milk | 175–200 |
| Salt | 4 |

The foregoing ingredients are formed into a dough or batter to which is added at the end of the mixing period about 0.47% hydrogen peroxide containing about 30% $H_2O_2$, and about 0.5% of yeast. These percentages are based upon the total weight of the batter. The dough so produced is permitted to stand until leavening and decomposition of the peroxide have taken place. The completion of the peroxide decomposition may be determined by the test above outlined. It has been found that the leavening or decomposition may be effected in about 25 minutes. The hydrogen peroxide having been decomposed, the batter is then molded or formed into desired shapes, placed in an oven, which may be either top or bottom heated, and baked.

Example II

A batter is produced by the admixture of the following ingredients:

| | | |
|---|---|---|
| Flour | pounds | 10 |
| Sugar | do | 10 |
| Eggs | do | 6 |
| Shortening | do | 4 |
| Liquid milk | do | 7 |
| Salt | ounces | 2.5 |
| Vanilla | do | 2 |

To the batter thus produced there may be added near the end of the mixing period about 0.7% hydrogen peroxide containing about 30% $H_2O_2$, and about 0.5% yeast. After permitting the batter to stand for leavening and hydrogen peroxide decomposition, it is shaped and baked.

Example III

A batter formed from ingredients given in Example II is produced and therewith is incorporated 0.7% concentrated hydrogen peroxide, about 0.5% yeast and about 0.075% of sodium bicarbonate. The dough, following leavening and substantially complete hydrogen peroxide decomposition, is shaped and baked in the usual manners.

Example IV

Biscuits like unto baking powder biscuits may be made by mixing the following ingredients to form a dough:

| | Grams |
|---|---|
| Flour | 300 |
| Liquid milk | 155 |
| Shortening | 60 |
| Salt | 4.5 |

When mixing of the dough has been completed, there may be added about 0.25% hydrogen peroxide containing about 30% $H_2O_2$, and about 0.5% yeast. The dough is then permitted to stand until the peroxide has undergone substantially complete decomposition, whereupon it is formed as desired and baked. The biscuits thus obtained have good volume, appearance and a normal flavor. A larger amount of hydrogen peroxide may be introduced, if desired, such as 1.85% to 3.7%, but then a longer decomposition time will be required.

Example V

A 68% sponge dough may be prepared containing the usual ingredients, including about 0.6% yeast. The sponge is permitted to set for a suitable period, for example, about three hours, and then it is admixed with the balance of the usual ingredients to which about 1.5% of hydrogen peroxide containing 30% $H_2O_2$ has been added. Following mixing the dough may be immediately panned if desired, and then allowed to rise and effect decomposition of the hydrogen peroxide. The dough is then baked into bread, and the product has the flavor of yeast-raised bread, is of good volume and crust characteristics, but has a grain which is somewhat more open than a straight yeast bread.

The foregoing procedures illustrate clearly the efficacy of the conjoint use of hydrogen peroxide with yeast, and an alkaline reacting material in the formation of baked products, especially in the production of cakes having relatively low and relatively high sugar and liquid content with respect to the quantity of flour entering into the mix. By the use of yeast, and of yeast and an alkaline reacting material the rate of decomposition of hydrogen peroxide is markedly increased, and thereby there is produced under varying oven conditions, such as top heating and bottom heating, loaves and layers which are characterized by lack of sagging or dropping back, by having a much finer and more uniform grain, increased volume, smoother and more uniform and more highly developed top crusts, well appearing and tender products.

Since certain changes in carrying out the above process, and certain modifications in the article which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the manufacture of leavened baked goods, which comprises effecting the leavening by the conjoint action of hydrogen peroxide, yeast and an alkaline reacting material at a pH value of 5.9 to 8.5, said leavening being effected principally by the hydrogen peroxide.

2. A process for the manufacture of leavened baked goods, which comprises effecting the leavening by the conjoint action of hydrogen peroxide, yeast and sodium bicarbonate, said leavening being effected principally by the hydrogen peroxide.

3. A process for the manufacture of leavened baked goods, which comprises effecting the leavening by the conjoint action of a hydrogen peroxide solution containing about 30% $H_2O_2$ and yeast at a pH value of 6.5 to 8.5, said leavening being effected principally by the hydrogen peroxide.

4. A process for the manufacture of leavened baked goods, which comprises effecting the leavening by the conjoint action at a pH value of 6.5 to 8.5 of a hydrogen peroxide solution containing about 30% $H_2O_2$, yeast and an alkaline reacting material the hydrogen peroxide being present in an amount based upon the total weight of the dough of 0.3 to 4.0%, said leavening being effected principally by the hydrogen peroxide.

5. A process for the manufacture of leavened baked goods, which comprises preparing a dough by admixing flour, sugar, salt and other usual dough ingredients, with which there is incorporated yeast, and hydrogen peroxide, said hydrogen peroxide being added toward the end of the mixing period and in an amount sufficient principally to effect leavening of the dough, the dough mass having a pH value of 6.5 to 8.5.

6. A process for the manufacture of leavened baked goods, which comprises preparing a dough by admixing flour, sugar, salt and other usual dough ingredients, with which there is incorporated yeast, an alkaline reacting material, and hydrogen peroxide, said hydrogen peroxide being added toward the end of the mixing period and in an amount sufficient principally to effect leavening of the dough, and said dough mass having a pH value of 6.5 to 8.5.

7. A process for the manufacture of leavened baked goods, which comprises preparing a dough containing flour, sugar, salt and other usual dough ingredients, with which there is incorporated a solution of hydrogen peroxide containing about 30% H₂O₂, yeast and sodium bicarbonate in substantially the following amounts based upon the total weight of the dough hydrogen peroxide 0.3 to 4.0%, yeast 0.25 to 1%, sodium bicarbonate 0.28% to 0.035%, said hydrogen peroxide being added toward the end of the mixing period and in an amount sufficient principally to effect leavening of the dough, and said dough having a pH value of 6.5 to 8.5.

8. A dough comprising flour, water, sugar, salt and other usual dough ingredients suitable for the production of leavened baked products, which has a pH value of 6.5 to 8.5 and includes as a leavening agent hydrogen peroxide and yeast, said hydrogen peroxide being present in an amount sufficient principally to effect leavening of the dough.

9. A dough comprising flour, water, sugar, salt and other usual dough ingredients suitable for the production of leavened baked products, which has a pH value of 6.5 to 8.5 and includes as a leavening agent hydrogen peroxide, yeast and sodium bicarbonate, said hydrogen peroxide being present in an amount sufficient principally to effect leavening of the dough.

10. A process for the manufacture of leavened baked goods, which comprises effecting the leavening by the conjoint action of hydrogen peroxide and yeast, said leavening being effected principally by the hydrogen peroxide.

JACOB FREILICH.
CHARLES N. FREY.